United States Patent
Katano

(10) Patent No.: US 8,758,952 B2
(45) Date of Patent: Jun. 24, 2014

(54) FUEL CELL SYSTEM WITH VIBRATION CONTROL

(75) Inventor: Koji Katano, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 799 days.

(21) Appl. No.: 12/526,141

(22) PCT Filed: Jul. 2, 2008

(86) PCT No.: PCT/JP2008/062362
§ 371 (c)(1),
(2), (4) Date: Aug. 6, 2009

(87) PCT Pub. No.: WO2009/005167
PCT Pub. Date: Jan. 8, 2009

(65) Prior Publication Data
US 2010/0323263 A1   Dec. 23, 2010

(30) Foreign Application Priority Data
Jul. 2, 2007   (JP) ................. 2007-173791

(51) Int. Cl.
*H01M 8/04* (2006.01)
(52) U.S. Cl.
CPC ...... *H01M 8/04089* (2013.01); *H01M 8/04201* (2013.01); *H01M 8/04753* (2013.01); *H01M 2250/20* (2013.01)
USPC .......................................... 429/444; 429/443
(58) Field of Classification Search
CPC .............. H01M 8/04; H01M 8/04082; H01M 8/04089; H01M 8/04201; H01M 8/04298; H01M 8/04694; H01M 8/04746; H01M 8/04753
USPC .................................................. 429/443, 444
See application file for complete search history.

(56) References Cited

U.S. PATENT DOCUMENTS

| | | | | |
|---|---|---|---|---|
| 4,109,108 | A * | 8/1978 | Coxon et al. | 381/71.5 |
| 7,040,432 | B2 * | 5/2006 | Kawasaki et al. | 180/65.1 |
| 7,484,416 | B1 * | 2/2009 | Klosinski et al. | 73/718 |
| 2005/0072239 | A1 * | 4/2005 | Longsdorf et al. | 73/649 |
| 2008/0261092 | A1 * | 10/2008 | Bono | 429/25 |
| 2009/0130510 | A1 * | 5/2009 | Ishikawa et al. | 429/23 |

FOREIGN PATENT DOCUMENTS

| | | | | |
|---|---|---|---|---|
| JP | 2001-006697 A | | 1/2001 | |
| JP | 2001006697 A | * | 1/2001 | H01M 8/02 |
| JP | 2005-302563 A | | 10/2005 | |
| WO | WO 2006126715 A1 | * | 11/2006 | H01M 8/04 |
| WO | WO 2007069554 A1 | * | 6/2007 | H01M 8/06 |
| WO | WO 2008/062806 A1 | | 5/2008 | |

OTHER PUBLICATIONS

Machine translation for Nakanishi, JP 2001-006697 A.*

* cited by examiner

*Primary Examiner* — Edu E Enin-Okut
(74) *Attorney, Agent, or Firm* — Kenyon & Kenyon LLP

(57) ABSTRACT

Disclosed is a fuel cell system including a fuel cell, a pipe forming a fuel supply passage through which a fuel gas supplied from a fuel supply source flows to the fuel cell, an on/off valve which regulates a gas state on the upstream side of the fuel supply passage to supply the gas to the downstream side, and control means for controlling the opening/closing operation of the on/off valve. The control means sets a required time from the opening time of the on/off valve to the closing time of the valve so that the vibration level of the pipe on the upstream side of the on/off valve is a predetermined reference level or less.

7 Claims, 5 Drawing Sheets

FUEL CELL SYSTEM WITH VIBRATION CONTROL

This is a 371 national phase application of PCT/JP2008/062362 filed 2 Jul. 2008, which claims priority to Japanese Patent Application No. 2007-173791 filed 2 Jul. 2007, the contents of which are incorporated herein by reference.

TECHNICAL FIELD

The present invention relates to a fuel cell system.

BACKGROUND ART

Heretofore, a fuel cell system, which includes a fuel cell for receiving a supplied reactant gas (a fuel gas and an oxidizing gas) to generate a power, has been suggested and put to practical use. Such a fuel cell system is provided with a pipe forming a fuel supply passage through which the fuel gas supplied from a fuel supply source such as a hydrogen tank flows to the fuel cell. Moreover, this pipe (the fuel supply passage) is usually provided with a pressure regulation valve (a regulator) which reduces the supply pressure of the fuel gas from the fuel supply source to a constant value.

Moreover, at present, a technology has been suggested in which an on/off valve for changing the supply state (a supply amount, a supply pressure or the like) of the fuel gas is provided in the pipe (the fuel supply passage) to change the supply state of the fuel gas in accordance with the operation state of the system (e.g., see Japanese Patent Application Laid-Open No. 2005-302563).

DISCLOSURE OF THE INVENTION

Meanwhile, in a fuel cell system disclosed in Japanese Patent Application Laid-Open No. 2005-302563, it is known that owing to the structural characteristics of an on/off valve, vibration is generated in a pipe when the valve opens and closes, and there has been a problem that the vibration generated during the valve opening is superimposed on the vibration generated during the valve closing and amplified to generate noise. Such noise becomes conspicuous especially during an intermittent operation or the like, and makes a user uncomfortable sometimes.

The present invention has been developed in view of such a situation, and an object thereof is to suppress the amplification of vibration caused by the opening/closing operation of an on/off valve in a fuel cell system including a pipe forming a fuel supply passage and the on/off valve provided in this pipe.

To achieve the object, a first fuel cell system according to the present invention is a fuel cell system comprising: a fuel cell; a pipe forming a fuel supply passage through which a fuel gas supplied from a fuel supply source flows to the fuel cell; an on/off valve which regulates a gas state on the upstream side of the fuel supply passage to supply the gas to the downstream side; and control means for controlling the opening/closing operation of the on/off valve, wherein the control means sets a required time from the opening time of the on/off valve to the closing time of the valve so that the vibration level of the pipe on the upstream side of the on/off valve is a predetermined reference level or less.

Moreover, a second fuel cell system according to the present invention is a fuel cell system comprising: a fuel cell; a pipe forming a fuel supply passage through which a fuel gas supplied from a fuel supply source flows to the fuel cell; an on/off valve which regulates a gas state on the upstream side of the fuel supply passage to supply the gas to the downstream side; and control means for controlling the opening/closing operation of the on/off valve, wherein the control means sets a required time from the closing time of the on/off valve to the opening time of the valve so that the vibration level of the pipe on the upstream side of the on/off valve is a predetermined reference level or less.

When such a constitution is employed, the required time from the opening time of the on/off valve to the closing time of the valve (or from the closing time to the opening time) can be set so that the vibration level of the pipe on the upstream side of the on/off valve is the predetermined reference level or less. For example, in order to suppress problems that vibration generated during the valve opening is superimposed on vibration generated during the valve closing and that the vibration of the pipe on the upstream side of the on/off valve is amplified, the required time from the opening time of the on/off valve to the closing time of the valve (or from the closing time to the opening time) can be longer than a heretofore required time. Therefore, the generation of the noise during the intermittent operation or the like can be suppressed. It is to be noted that "the gas state" is the state of the gas represented by a flow rate, a pressure, a temperature, a molar concentration or the like, and especially includes at least one of the gas flow rate and the gas pressure.

In the fuel cell system, it is also possible to employ control means for setting the required time from the opening time of the on/off valve to the closing time of the valve (or from the closing time to the opening time) so that the vibration level of the pipe on the downstream side of the on/off valve is the predetermined reference level or less.

When such a constitution is employed, it is possible to set the required time from the opening time of the on/off valve to the closing time of the valve (or from the closing time to the opening time) so that the vibration level of the pipe on the downstream side of the on/off valve is the predetermined reference level or less. Therefore, the generation of the noise during the intermittent operation or the like can be suppressed.

Moreover, it is also possible to employ control means for setting the required time from the opening time of the on/off valve to the closing time of the valve (or from the closing time to the opening time) so that the vibration level of the on/off valve itself is the predetermined reference level or less.

When such a constitution is employed, it is possible to set the required time from the opening time of the on/off valve to the closing time of the valve (or from the closing time to the opening time) so that the vibration level of the on/off valve itself is the predetermined reference level or less.

Moreover, in the fuel cell system, it is possible to employ control means for setting the required time from the opening time of the on/off valve to the closing time of the valve (or from the closing time to the opening time) so that vibration reverse to vibration generated during the opening of the on/off valve is generated during the closing of the on/off valve (or vibration reverse to vibration generated during the closing of the on/off valve is generated during the opening of the on/off valve).

When such a constitution is employed, the vibration generated during the valve opening can be superimposed on the vibration generated during the valve closing to decay (or cancel) the vibration, so that the generation of the noise can effectively be suppressed.

Furthermore, the fuel cell system may include a vibration sensor which detects the vibration level of the pipe or the on/off valve. In such a case, it is possible to employ control means for setting the required time from the opening time of the on/off valve to the closing time of the valve (or from the closing time to the opening time) based on the vibration level detected by the vibration sensor.

When such a constitution is employed, the feedback control of the opening/closing time of the on/off valve can be realized so that the vibration level detected by the vibration sensor is the predetermined reference level or less.

In addition, when the pipe of the fuel cell system is fixed to a predetermined mobile body, the vibration sensor is preferably disposed in the vicinity of a pipe fixing portion of the mobile body.

When such a constitution is employed, it is possible to appropriately cope with a case where the pipe is cylindrical and the vibration sensor is not easily attached to the pipe or a case where the vibration sensor attached to the pipe easily vibrates and the vibration of the pipe cannot easily be detected.

Moreover, in the fuel cell system, a surge tank (a pressure regulation tank) may be provided in the pipe on the upstream side of the on/off valve.

When such a constitution is employed, the pulsation can be suppressed by the surge tank, in a case where the required time from the opening time of the on/off valve to the closing time of the valve (or from the closing time to the opening time) is lengthened so that the vibration level of the pipe on the upstream side of the on/off valve is the predetermined reference level or less, whereby the pulsation of the gas in the pipe on the upstream side of the on/off valve increases. Therefore, the vibration caused by the pulsation of the gas can be suppressed.

Furthermore, in the fuel cell system, an injector can be employed as the on/off valve.

The injector is an electromagnetic driving type on/off valve in which a valve body is directly driven with an electromagnetic driving force for a predetermined drive cycle and detached from a valve seat, whereby a gas state (a gas flow rate or a gas pressure) can be regulated. A predetermined control section drives the valve body of the injector to control the injection timing or injection time of the fuel gas, whereby the flow rate or pressure of the fuel gas can be controlled.

According to the present invention, in the fuel cell system including the pipe forming the fuel supply passage and the on/off valve provided in this pipe, the amplification of the vibration caused by the opening/closing operation of the on/off valve can be suppressed.

BEST MODE FOR CARRYING OUT THE INVENTION

Hereinafter, a fuel cell system 1 according to an embodiment of the present invention will be described with reference to the drawings.

Figure 1:
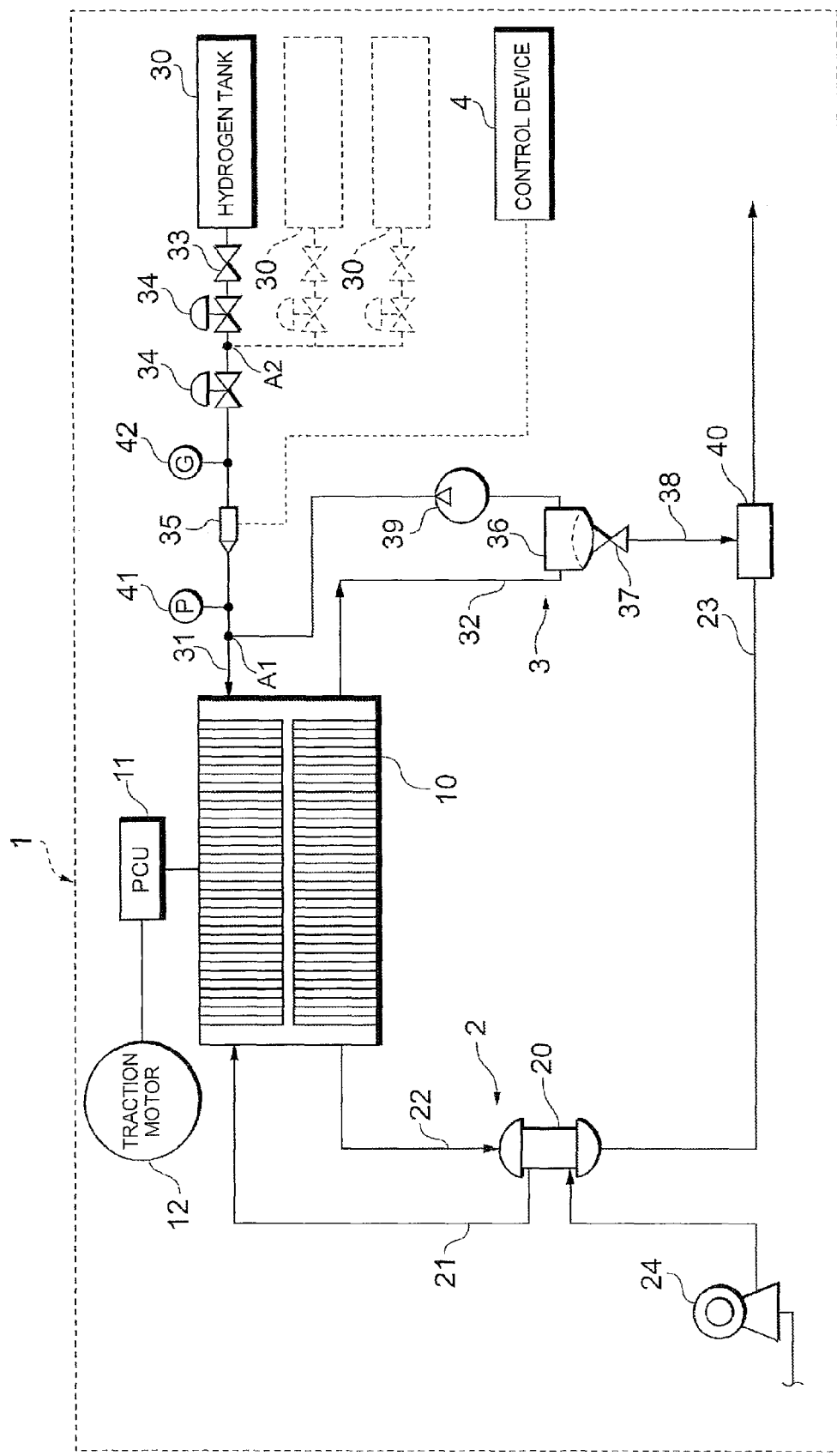
FIG. 1 is a constitution diagram of a fuel cell system according to an embodiment of the present invention.
Figure 2:
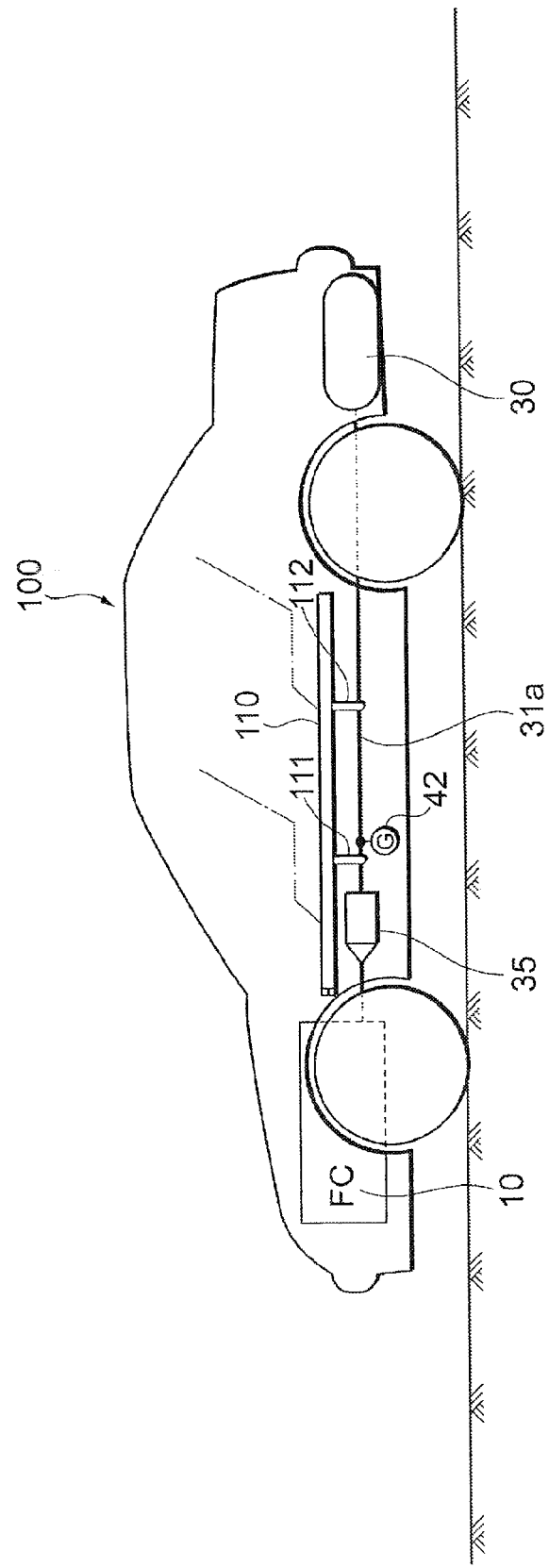
FIG. 2 is an explanatory view showing a state in which the fuel cell system according to the embodiment of the present invention is mounted in a fuel cell vehicle.

First, a constitution of the fuel cell system 1 according to the embodiment of the present invention will be described with reference to FIGS. 1 to 5B. As shown in FIG. 1, the fuel cell system 1 according to the present embodiment includes a fuel cell 10 which receives a supplied reactant gas (an oxidizing gas and a fuel gas) to generate a power, and the system also includes an oxidizing gas piping system 2 which supplies air as the oxidizing gas to the fuel cell 10, a hydrogen gas piping system 3 which supplies a hydrogen gas as the fuel gas to the fuel cell 10, a control device 4 which integrally controls the whole system and the like. As shown in FIG. 2, the fuel cell system 1 according to the present embodiment is mounted in a fuel cell vehicle 100, and functions as a car-mounted power generation system.

The fuel cell 10 has a stack structure in which the required number of unitary cells for receiving the supplied reactant gas to generate the power is stacked. The power generated by the fuel cell 10 is supplied to a power control unit (PCU) 11. The PCU 11 includes an inverter, a DC-DC converter and the like arranged between the fuel cell 10 and a traction motor 12.

The oxidizing gas piping system 2 includes an air supply passage 21 which supplies the oxidizing gas (air) humidified by a humidifier 20 to the fuel cell 10, an air discharge passage 22 which guides, to the humidifier 20, an oxidizing off gas discharged from the fuel cell 10, and an exhaust passage 23 for guiding the oxidizing off gas externally from the humidifier 20. The air supply passage 21 is provided with a compressor 24 which takes the oxidizing gas from atmospheric air to feed the gas under pressure to the humidifier 20.

The hydrogen gas piping system 3 includes a hydrogen tank 30 as a fuel supply source which receives the hydrogen gas having a high pressure, a hydrogen supply passage 31 as a fuel supply passage for supplying the hydrogen gas of the hydrogen tank 30 to the fuel cell 10, and a circulation passage 32 for returning, to the hydrogen supply passage 31, a hydrogen off gas discharged from the fuel cell 10. It is to be noted that instead of the hydrogen tank 30, a reformer for forming a hydrogen-rich reformed gas from a hydrocarbon-based fuel, and a high-pressure gas tank for bringing the reformed gas formed by this reformer into a high-pressure state to accumulate the pressure may be employed as the fuel supply source. Moreover, a tank having a hydrogen occluded alloy may be employed as the fuel supply source.

The hydrogen supply passage 31 is provided with a shut valve 33 which shuts or allows the supply of the hydrogen gas from the hydrogen tank 30, a regulator 34 which regulates the pressure of the hydrogen gas, and an injector 35. On the downstream side of the injector 35 and the upstream side of a joining part A1 between the hydrogen supply passage 31 and the circulation passage 32, a secondary pressure sensor 41 for detecting the pressure of the hydrogen gas in the hydrogen supply passage 31 is provided. Furthermore, in the vicinity of the upstream side of the injector 35 of a pipe 31a (FIGS. 2 and 3) forming the hydrogen supply passage 31, a vibration sensor 42 for detecting the vibration level (the acceleration) of the pipe 31a is provided. The vibration level of the pipe 31a detected by the vibration sensor 42 is transmitted to the control device 4 and used in vibration suppressing control described later.

In the present embodiment, as shown in FIG. 2, the fuel cell 10 is disposed in the front part of the fuel cell vehicle 100, and the hydrogen tank 30 is disposed in the rear part of the fuel cell vehicle 100, respectively. Moreover, the pipe 31a forming the hydrogen supply passage 31 is fixed to the lower part of an undercarriage 110 of the fuel cell vehicle 100. The pipe 31a is fixed to two pipe fixing portions 111, 112 of the undercarriage 110, and the vibration sensor 42 is attached to the vicinity of the upstream side of the injector 35 of the pipe 31a.

The regulator 34 is a device which regulates the upstream pressure (the primary pressure) of the regulator into a preset secondary pressure. In the present embodiment, a mechanical pressure reduction valve for reducing the primary pressure is employed as the regulator 34. As a constitution of the mechanical pressure reduction valve, a known constitution may be employed which has a housing provided with a back pressure chamber and a pressure regulation chamber formed via a diaphragm and in which the primary pressure is reduced to a predetermined pressure owing to the back pressure of the back pressure chamber to form the secondary pressure in the pressure regulation chamber. In the present embodiment, as shown in FIG. 1, two regulators 34 are arranged on the upstream side of the injector 35, whereby the upstream pressure of the injector 35 can effectively be reduced. Therefore, a degree of freedom in design of a mechanical structure (a valve body, a housing, a passage, a driving device and the like) of the injector 35 can be raised. Moreover, the upstream pressure of the injector 35 can be reduced, so that it can be prevented that the valve body of the injector 35 does not easily move owing to the increase of a pressure difference between the upstream pressure and a downstream pressure of the injector 35. Therefore, the variable pressure regulation range of the downstream pressure of the injector 35 can be broadened, and the lowering of the response property of the injector 35 can be suppressed.

Figure 3:
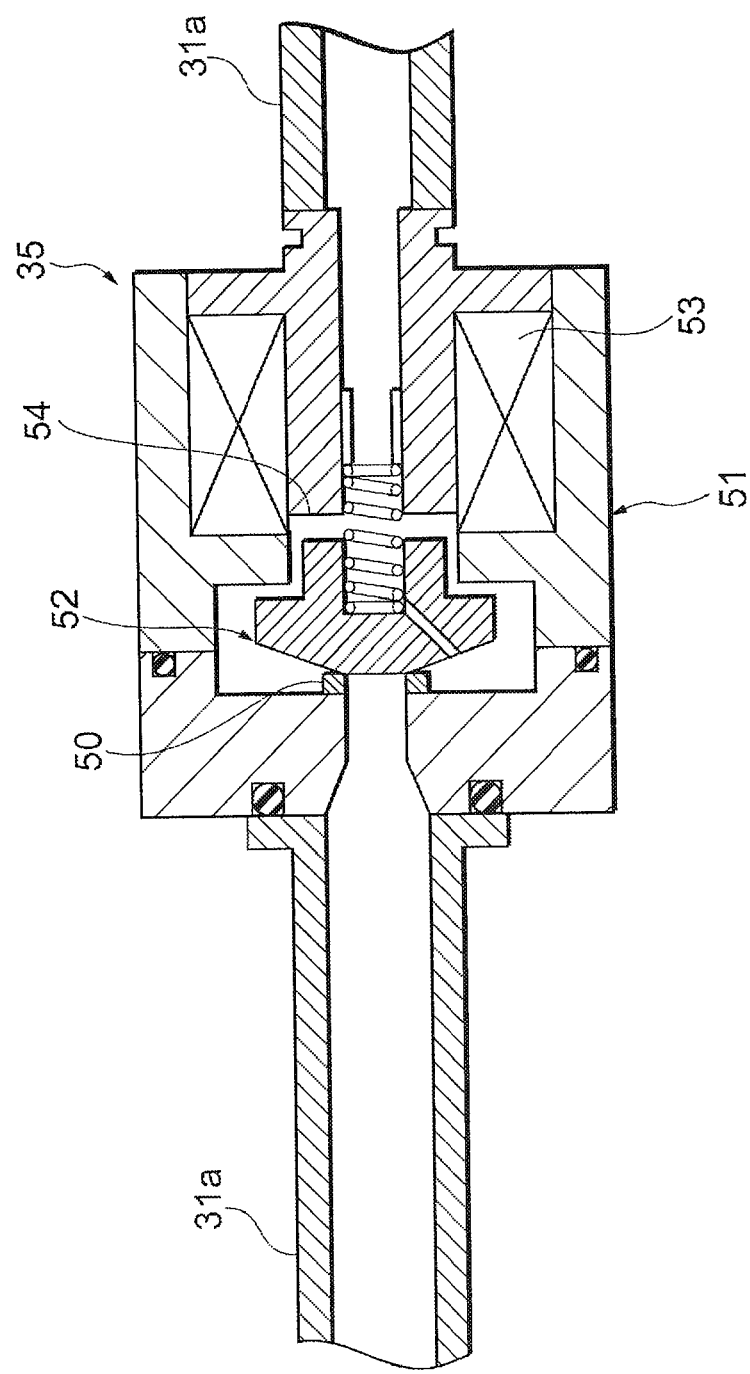
FIG. 3 is an explanatory view showing an inner structure of an injector of the fuel cell system shown in FIG. 1.

As shown in FIG. 3, the injector 35 is an electromagnetic driving type on/off valve in which a valve body 52 is directly driven with an electromagnetic driving force for a predetermined drive cycle and detached from a valve seat 50, whereby a gas flow rate or a gas pressure can be regulated. In the present embodiment, as shown in FIG. 1, the injector 35 is disposed on the upstream side from the joining part A1 between the hydrogen supply passage 31 and the circulation passage 32. Moreover, as shown by broken lines in FIG. 1, when a plurality of hydrogen tanks 30 are employed as fuel supply sources, the injector 35 is disposed on the downstream side from a part (a hydrogen gas joining part A2) where the hydrogen gases supplied from the hydrogen tanks 30 join one another.

As shown in FIG. 3, the injector 35 includes the valve seat 50 having an injection hole which injects a gas fuel such as the hydrogen gas, and also includes a nozzle body 51 which supplies and guides the gas fuel to the injection hole, and the valve body 52 movably received and held in an axial direction (a gas flow direction) with respect to the nozzle body 51 to open and close the injection hole. In the present embodiment, the valve body 52 of the injector 35 is driven by a solenoid 53 which is an electromagnetic driving device, and a pulse-like excitation current supplied to this solenoid 53 can be turned on or off to switch the opening area of the injection hole in two stages or multiple stages. The gas injection time and gas injection timing of the injector 35 are controlled based on a control signal output from the control device 4, whereby the flow rate and pressure of the hydrogen gas are precisely controlled. In the injector 35, the valve (the valve seat 50 and the valve body 52) is directly driven with the electromagnetic driving force to open or close, and the drive cycle of the valve can be controlled into a highly responsive region, so that the injector has a high response property.

The injector 35 is provided with a stopper 54 which regulates the backward movement of the valve body 52. Therefore, during valve opening, to open the injection hole of the injector 35, the valve body 52 detached from the valve seat 50 abuts on the stopper 54, whereby vibration is generated in the injector 35 itself and the pipe 31a on the upstream side and downstream side of the injector 35. Moreover, even during valve closing, to close the injection hole of the injector 35, the valve body 52 abuts on the valve seat 50, whereby vibration is generated in the injector 35 itself and the pipe 31a on the upstream side and downstream side of the injector 35. In the present embodiment, to suppress the amplification of the vibration caused by such an opening closing operation of the injector 35, a required time from the opening time to the closing time of the injector (or from the closing time to the opening time) is regulated. The details of vibration suppressing control will be described later.

In the injector 35, to supply the gas with a demanded flow rate to the downstream side of the injector, at least one of the opening area (the open degree) and opening time of the valve provided in a gas passage of the injector 35 is changed, whereby the flow rate (or the hydrogen molar concentration) of the gas to be supplied to the downstream side (the fuel cell 10 side) is regulated. It is to be noted that the valve of the injector 35 is opened or closed to regulate the gas flow rate, and the pressure of the gas to be supplied to the downstream side of the injector 35 is reduced as compared with the gas pressure on the upstream side of the injector 35, so that the injector 35 can be interpreted as a pressure regulation valve (a pressure reduction valve, a regulator). Moreover, in the present embodiment, the injector can be interpreted as a variable pressure regulation valve capable of changing the pressure regulation amount (the pressure reduction amount) of the upstream gas pressure of the injector 35 so that the pressure meets a demanded pressure in a predetermined pressure range based on a gas demand.

The circulation passage 32 is connected to a discharge passage 38 via a gas-liquid separator 36 and a gas/water discharge valve 37. The gas-liquid separator 36 collects a water content from the hydrogen off gas. The gas/water discharge valve 37 operates based on a command from the control device 4 to discharge (purge), from the system, the water content collected by the gas-liquid separator 36 and the hydrogen off gas (the fuel off gas) including impurities in the circulation passage 32. Moreover, the circulation passage 32 is provided with a hydrogen pump 39 which pressurizes the hydrogen off gas in the circulation passage 32 to feed the gas toward the hydrogen supply passage 31. It is to be noted that the hydrogen off gas discharged through the gas/water discharge valve 37 and the discharge passage 38 joins the oxidizing off gas in the exhaust passage 23 and is diluted by a diluter 40.

The control device 4 detects the operation amount of an acceleration operating member (an accelerator or the like) provided in the vehicle, and receives control information such as a demanded acceleration value (e.g., a demanded power generation amount from a load device such as the traction motor 12) to control the operations of various units in the system. It is to be noted that the load device is a generic power consumption device including, in addition to the traction motor 12, an auxiliary device (e.g., a motor of the compressor 24, the hydrogen pump 39, a cooling pump or the like) required for operating the fuel cell 10, an actuator for use in various devices (a change gear, a wheel control device, a steering device, a suspension device and the like) associated with the running of the vehicle, an air conditioning device (an air conditioner), illumination and audio of a passenger space and the like.

The control device 4 is constituted of a computer system (not shown). Such a computer system includes a CPU, an ROM, an RAM, an HDD, an input/output interface, a display and the like, and the CPU reads various control programs recorded in the ROM to execute the programs, whereby various control operations are realized.

Specifically, based on the operation state of the fuel cell 10, the control device 4 calculates the amount (hereinafter referred to as "the hydrogen consumption") of the hydrogen gas consumed by the fuel cell 10, and the target pressure value (the target gas supply pressure with respect to the fuel cell 10) of the hydrogen gas in a downstream position of the injector 35. Moreover, the control device 4 calculates a feedback correction flow rate based on a deviation between the calculated target pressure value and a detected pressure value in the downstream position of the injector 35 detected by the secondary pressure sensor 41, and adds up the hydrogen consumption and the feedback correction flow rate to calculate the injection flow rate of the injector 35. Subsequently, the control device 4 sends a control signal for realizing the injection flow rate of the injector 35 to control the gas injection time and gas injection timing of the injector 35 and to regulate the flow rate and pressure of the hydrogen gas to be supplied to the fuel cell 10. Thus, the control device 4 controls the injector 35 with reference to the detected pressure value in the downstream position of the injector 35 detected by the secondary pressure sensor 41.

Moreover, the control device 4 detects the vibration level (the acceleration) of the pipe 31a on the upstream side of the injector 35 by use of the vibration sensor 42, and sets a required time $\tau$ from the opening time to the closing time of the injector 35, and a required time $\gamma_{rest}$ from the closing time to the opening time of the injector 35 so that the detected vibration level is a predetermined reference level or less. That is, the control device 4 performs the feedback control of the opening/closing operation of the injector 35 based on the detected vibration level of the pipe 31a.

Figures 4A, 4B:
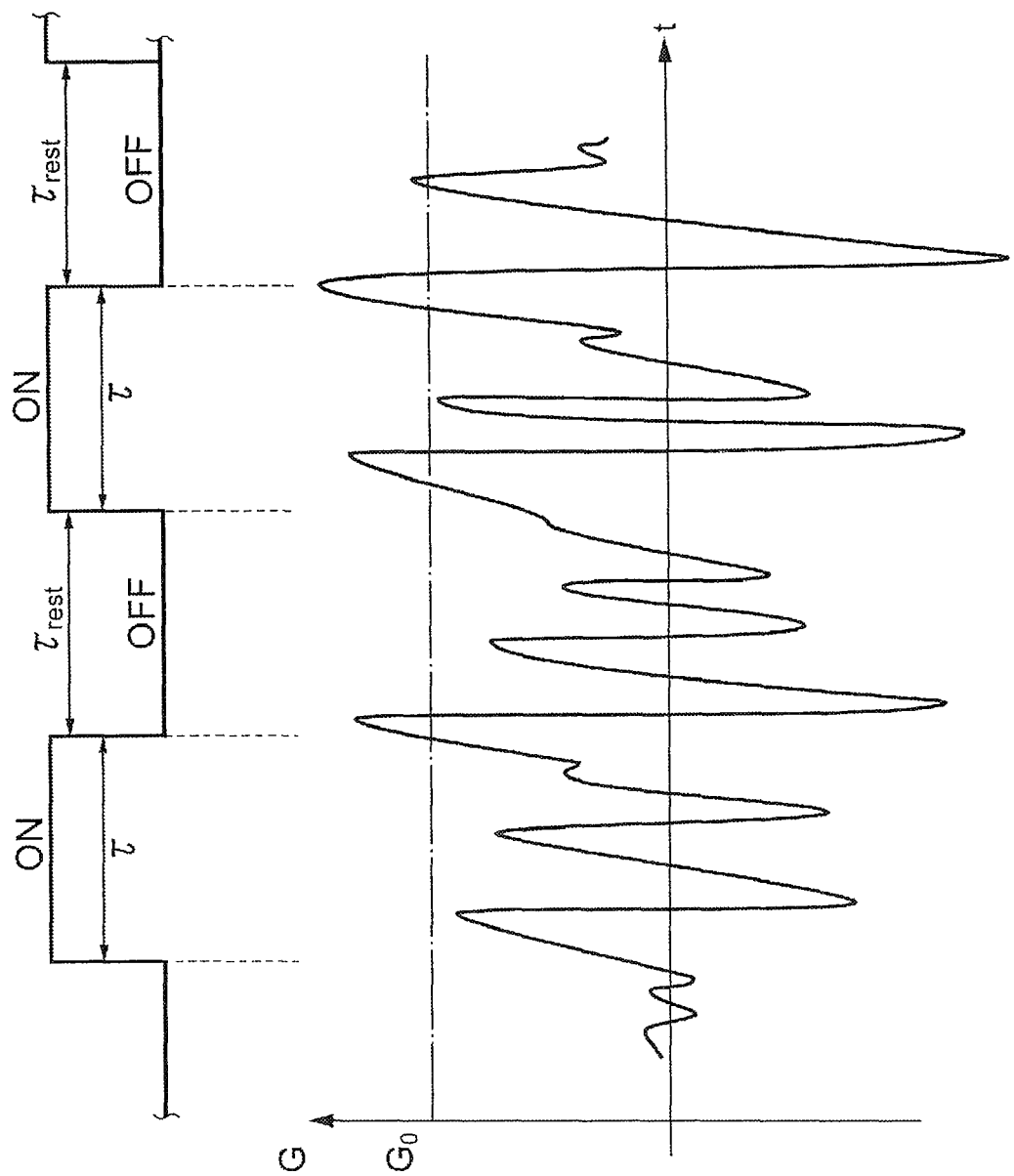
FIG. 4A is a time chart showing the opening/closing operation of a conventional injector.
FIG. 4B is a time chart showing the history of a vibration level in a pipe on the upstream side of the conventional injector with an elapse of time.
Figure 5A:
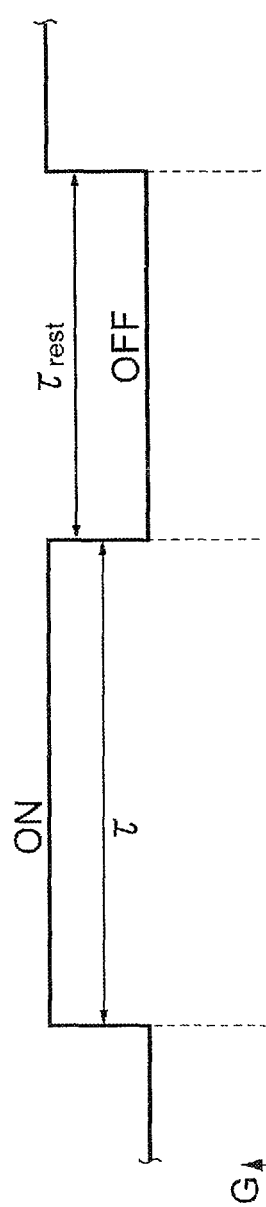
FIG. 5A is a time chart showing the opening/closing operation of an injector of the fuel cell system shown in FIG. 1.
Figure 5B:
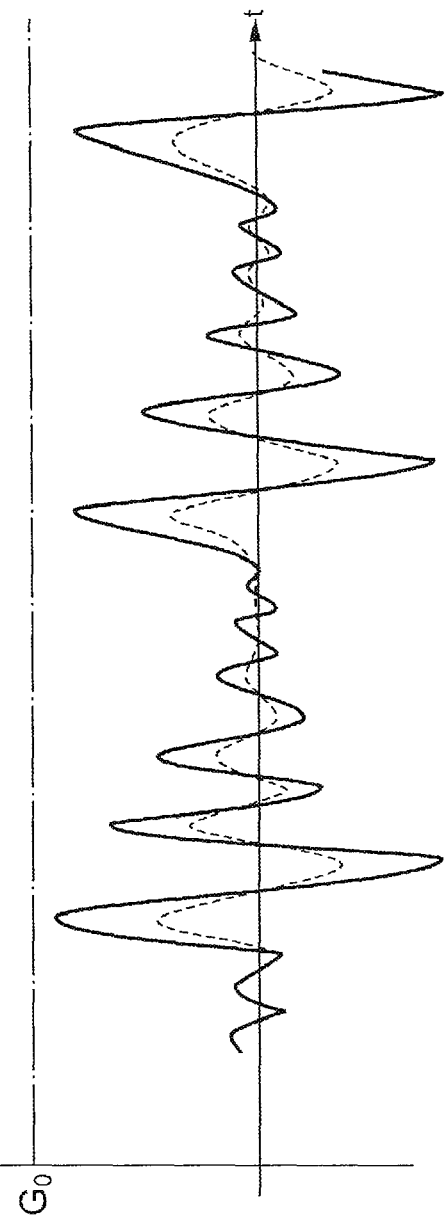
FIG. 5B is a time chart showing the history of a vibration level in a pipe on the upstream side of the injector of the fuel cell system shown in FIG. 1 with an elapse of time.

FIG. 4A is a time chart showing the opening/closing operation of a conventional injector, and FIG. 4B is a time chart showing the vibration level (an acceleration G) of a pipe on the upstream side of the injector owing to the opening/closing operation of the conventional injector. On the other hand, FIG. 5A is a time chart showing the opening/closing operation of the injector 35 in the present embodiment, and FIG. 5B is a time chart showing the vibration level (an acceleration G) of the pipe 31a on the upstream side of the injector 35 owing to the opening/closing operation of the injector 35 in the present embodiment.

In the conventional system, as shown in FIG. 4A, the required time $\tau$ from the opening time to the closing time of the injector is comparatively short, and hence the vibration generated during the valve opening of the injector is superimposed on the vibration generated during the valve closing of the injector, whereby as shown in FIG. 4B, the vibration level (the acceleration G) of the pipe exceeds a predetermined reference level (a reference value $G_0$), and noise is generated. On the other hand, in the present embodiment, as shown in FIG. 5A, the required time $\tau$ from the opening time to the closing time of the injector 35 is set to a comparatively long time, and hence the vibration generated during the valve opening of the injector 35 can be prevented from being superimposed on the vibration generated during the valve closing of the injector 35. Moreover, in the present embodiment, as shown in FIG. 5A, the required time $\gamma_{rest}$ from the closing time to the opening time of the injector 35 is also set to a comparatively long time, and hence the vibration generated during the valve closing of the injector 35 can be prevented from being superimposed on the vibration generated during the valve opening of the injector 35. In consequence, as shown in FIG. 5B, the vibration level (the acceleration G) of the pipe 31a can be suppressed to the predetermined reference level (the reference value $G_0$) or less, and the generation of the noise can effectively be suppressed.

In the fuel cell system 1 according to the above-mentioned embodiment, the required time $\tau$ from the opening time to the closing time of the injector 35 (and the required time $\gamma_{rest}$ from the closing time to the opening time of the injector 35) can be set so that the vibration level of the pipe 31a on the upstream side of the injector 35 is the predetermined reference level or less. Specifically, to suppress problems that the vibration generated during the valve opening of the injector 35 is superimposed on the vibration generated during the valve closing and that the vibration of the pipe 31a on the upstream side of the injector 35 is amplified, the required time $\tau$ from the opening time to the closing time of the injector 35 (and the required time $\gamma_{rest}$ from the closing time to the opening time of the injector) can be set to a time longer than a heretofore required time. Therefore, it is possible to suppress the generation of the noise during an intermittent operation or the like.

It is to be noted that in the above embodiment, there has been described an example in which the vibration sensor 42 is attached to the pipe 31a forming the hydrogen supply passage 31, but the vibration sensor 42 may be fixed to the vicinity of the pipe fixing portion 111 (112) of the fuel cell vehicle 100 shown in FIG. 2. In this case, it is possible to appropriately cope with a case where the pipe 31a is cylindrical and the vibration sensor 42 is not easily attached to the pipe or a case where the vibration sensor 42 attached to the pipe 31a easily vibrates and the vibration of the pipe 31a cannot easily be detected.

Moreover, in the above embodiment, the required time $\tau$ from the opening time to the closing time of the injector 35 is set to the comparatively long time so that the vibration level of the pipe 31a on the upstream side of the injector 35 is the predetermined reference level or less, but in this case, the pulsation of the gas in the pipe 31a on the upstream side of the injector 35 increases sometimes. To suppress such pulsation of the gas, the pipe 31a on the upstream side of the injector 35 may be provided with a surge tank (a pressure regulation tank). In this case, the surge tank can suppress the pulsation of the gas in the pipe 31a, so that the vibration caused by the pulsation of the gas can be suppressed. Moreover, the surge tank itself has a vibration suppressing function, so that as shown by a broken line in the time chart of FIG. 5B, the vibration level of the pipe 31a on the upstream side of the injector 35 can be decreased.

Furthermore, in the above embodiment, there has been described an example in which the vibration sensor 42 is attached to the pipe 31a on "the upstream side" of the injector 35, and the opening/closing time of the injector 35 is controlled so that the vibration level of the pipe 31a on "the upstream side" of the injector 35 is the predetermined reference level or less. However, the vibration sensor may be attached to the pipe 31a on "the downstream side" of the injector, and the opening/closing time of the injector 35 may be controlled so that the vibration level of the pipe 31a on "the downstream side" of the injector 35 is the predetermined reference level or less. Moreover, the vibration sensor may be attached to the injector 35 itself, and the opening/closing time of the injector 35 may be controlled so that the vibration level of the injector 35 itself is the predetermined reference level or less.

Additionally, in the above embodiment, there has been described an example in which the opening/closing time of the injector 35 is controlled to prevent the vibration generated during the valve opening of the injector 35 from being superimposed on the vibration generated during the valve closing, but the opening/closing time of the injector 35 may be controlled so that vibration reverse to the vibration generated during the valve opening of the injector 35 is generated during the valve closing of the injector 35 (or vibration reverse to the vibration generated during the valve closing of the injector 35 is generated during the valve opening of the injector 35). In this case, the vibration generated during the valve opening can be superimposed on the vibration generated during the valve closing to decay (or cancel) the vibration, so that the generation of the noise can effectively be suppressed.

INDUSTRIAL APPLICABILITY

As described in the above embodiment, a fuel cell system according to the present invention can be mounted in a fuel cell vehicle, and the system may be mounted in various mobile bodies (a robot, a ship, an airplane, etc.) other than the fuel cell vehicle. Moreover, the fuel cell system according to the present invention may be applied to a stational power generation system for use as a power generation equipment for construction (housing, building or the like).

The invention claimed is:

1. A fuel cell system comprising: a fuel cell; a pipe forming a fuel supply passage through which a fuel gas supplied from a fuel supply source flows to the fuel cell; an on/off valve which regulates a gas state on the upstream side of the fuel supply passage to supply the gas to the downstream side; and a control portion that controls the opening/closing operation of the on/off valve,
wherein the control portion is programmed to set a required time from the opening time of the on/off valve to the closing time of the valve so that the vibration level of the pipe on the upstream side of the on/off valve is a predetermined reference level or less.

2. The fuel cell system according to claim 1, wherein the control portion is programmed to set the required time from the opening time of the on/off valve to the closing time of the valve so that the vibration level of the pipe on the downstream side of the on/off valve is the predetermined reference level or less.

3. The fuel cell system according to claim 1, wherein the control portion is programmed to set the required time from the opening time of the on/off valve to the closing time of the valve so that vibration reverse to vibration generated during the opening of the on/off valve is generated during the closing of the on/off valve.

4. The fuel cell system according to claim 1, further comprising:
a vibration sensor which is configured to detect the vibration level of the pipe,
wherein the control portion is programmed to set the required time from the opening time of the on/off valve to the closing time of the valve based on the vibration level detected by the vibration sensor.

5. The fuel cell system according to claim 4, wherein the pipe is fixed to a predetermined mobile body, and
the vibration sensor is disposed in the vicinity of a pipe fixing portion of the mobile body.

6. The fuel cell system according to claim 1, further comprising:
a surge tank provided in the pipe on the upstream side of the on/off valve.

7. The fuel cell system according to claim 1, wherein the on/off valve is an injector.

* * * * *